(12) United States Patent
Kanno et al.

(10) Patent No.: US 8,443,926 B2
(45) Date of Patent: May 21, 2013

(54) ELECTRIC MOTORCYCLE

(75) Inventors: Yoshihisa Kanno, Wako (JP); Hiroyuki Kikuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 13/057,179

(22) PCT Filed: Sep. 3, 2009

(86) PCT No.: PCT/JP2009/004359
§ 371 (c)(1),
(2), (4) Date: Feb. 2, 2011

(87) PCT Pub. No.: WO2010/038357
PCT Pub. Date: Apr. 8, 2010

(65) Prior Publication Data
US 2011/0139531 A1 Jun. 16, 2011

(30) Foreign Application Priority Data
Sep. 30, 2008 (JP) .................................. 2008-255462

(51) Int. Cl.
*B62K 11/00* (2006.01)
*B62M 7/00* (2010.01)

(52) U.S. Cl.
USPC ............ 180/220; 180/227; 180/228; 180/229

(58) Field of Classification Search
USPC ........................ 180/219, 220, 227, 228, 229
See application file for complete search history.

(56) References Cited

U.S. PATENT DOCUMENTS

| 5,577,747 | A | 11/1996 | Ogawa et al. | |
| 7,210,550 | B2* | 5/2007 | Yonehana et al. | 180/220 |
| 7,931,110 | B2* | 4/2011 | Nishiura et al. | 180/220 |
| 8,002,067 | B2* | 8/2011 | Nishiura et al. | 180/220 |
| 8,028,785 | B2* | 10/2011 | Kanno et al. | 180/220 |
| 2004/0238242 | A1 | 12/2004 | Honda et al. | |

FOREIGN PATENT DOCUMENTS

| CN | 1117451 A | 2/1996 |
| CN | 101249871 A | 8/2008 |
| EP | 0 648 632 A2 | 4/1995 |
| JP | 6-247374 A | 9/1994 |
| JP | 7-112617 A | 5/1995 |
| JP | 11-034965 A | 2/1999 |
| JP | 3317560 B2 | 8/2002 |
| JP | 2004-352188 A | 12/2004 |
| JP | 2008-255462 | 9/2008 |
| TW | 272212 I | 2/2007 |

* cited by examiner

*Primary Examiner* — Kevin Hurley
*Assistant Examiner* — Marc A Scharich
(74) *Attorney, Agent, or Firm* — Birch, Stewart, Kolasch & Birch, LLP

(57) ABSTRACT

An electric motorcycle in which a power drive unit and a motive power generation motor for traveling are secured to a swing arm swinging around a pivot shaft, and power from a battery is supplied through the power drive unit to the motive power generation motor. A hollow inside of the swing arm is partitioned into an air introducing space and an equipment fixing space by a partition wall. The power drive unit is secured in the equipment fixing space so as to be in close contact with the partition wall and a fin extending from the partition wall to the air introducing space are formed at a fixing surface of the air introducing space to which the power drive unit is attached.

11 Claims, 9 Drawing Sheets

ELECTRIC MOTORCYCLE

TECHNICAL FIELD

The present invention relates to an electric motorcycle in which high-temperature equipment such as a battery, etc. mounted in a vehicle body can be cooled.

BACKGROUND ART

There has been known an electric motorcycle in which a battery is mounted and a motive power generation motor for travel is driven with electric power supplied from the battery. In such an electric motorcycle, in order to cool the battery, air in a battery box in which the battery is mounted is sucked by a cooling fan so that the inside of the battery box is cooled by air (for example, see Patent Document 1).

Furthermore, electric power supplied from the battery is supplied to the motive power generation motor through a power drive unit having a driving circuit, etc. incorporated therein.

PRIOR ART DOCUMENT

Patent Document

Patent Document 1: Specification of JP-B-3,317,560

SUMMARY OF THE INVENTION

Problem to be Solved by the Invention

It is preferable in such an electric motorcycle to cool not only the battery, but also the power drive unit, the coil of the motive power generation motor, etc., for example. However, when cooling fans are respectively appended to the power drive unit, the motive power generation motor, etc. one by one to cool these units with air, it is necessary to individually provide the mount spaces for these cooling fans. In addition, the number of parts is increased, so that the number of fabrication steps and the cost are increased.

The present invention has been implemented in view of the foregoing situation, and has an object to provide an electric motorcycle in which a power drive unit, a motive power generation motor, etc. can be efficiently cooled.

Means of Solving the Problem

The content of the Japanese Patent Application No. 2008-255462 filed on Sep. 30, 2008 is incorporated herein by reference in its entirety.

In order to solve the above problems, according to the present invention, an electric motorcycle in which a power drive unit and a motive power generation motor for traveling are secured to a swing arm swinging around a pivot shaft, and power from a battery is supplied through the power drive unit to the motive power generation motor, is characterized in that a hollow inside of the swing arm is partitioned into an air introducing space and an equipment fixing space by a partition wall, the power drive unit is secured in the equipment fixing space so as to be in close contact with the partition wall, and a fin extending from the partition wall to the air introducing space is formed at a portion in the air introducing space which corresponds to the fixed portion of the power drive unit.

According to this construction, the heat of the drive unit is thermally conducted to the partition wall, and the heat of the partition wall is further transmitted to the fin.

Furthermore, the motive power generation motor may be disposed in the equipment fixing space, and air holes through which the air introducing space and the equipment fixing space intercommunicate with each other may be formed at a fixing portion of the partition wall at which the motive power generation motor is fixed.

According to this construction, air in the air introducing space can be fed to the motive power generation motor fixed in the equipment fixing space.

Moreover, the air introducing space and the equipment fixing space may be formed so as to extend in a front-and-rear direction of the vehicle, an air introducing port to the air introducing space may be formed in the neighborhood of the pivot shaft, the power drive unit may be disposed between the pivot shaft and the motive power generation motor, and the fins may be formed so as to extend from the air introducing port to the air holes.

According to this construction, the power drive unit and the motive power generation motor can be arranged in the front-and-rear direction of the vehicle along the shape of the swing arm extending in the front-and-rear direction of the vehicle body.

Still furthermore, the equipment fixing space may be disposed at an outside portion in the width direction of the vehicle body than the air introducing space, and a detachable outer cover may be provided to cover the outer portion of the equipment fixing space with respect to the vehicle body.

According to this construction, the power drive unit and the motive power generation motor disposed in the outer equipment fixing space are exposed to the outside of the vehicle body by detaching the outer cover.

Furthermore, the air introducing space may be disposed at an inside portion in the width direction of the vehicle body than the equipment fixing space, and a detachable inner cover may be provided to cover the inner portion of the air introducing space with respect to the vehicle body.

According to this construction, the air introducing space side can be exposed by detaching the inner cover.

Moreover, a plurality of fins may be formed, and the air holes may be formed so as to correspond to the air introducing space compartmented by the fins.

According to this construction, air can be fed from the air holes to the motive power generation motor side every compartment.

Still furthermore, the swing arm may be provided with a rib forming an air discharge passage through which air introduced from the air holes communicating from the air introducing space to the equipment fixing space is discharged through the motive power generation motor to the outside.

According to this construction, introduced air can be guided to the air discharge port without disturbing the flow of the introduced air.

Effect of the Invention

According to this invention, in the electric motorcycle in which the power drive unit and the motive power generation motor for traveling are secured to the swing arm which swings around the center of the pivot shaft and power from the battery is supplied through the power drive unit to the motive power generation motor, the hollow inside of the swing arm is compartmented into the air introducing space and the equipment fixing space by the partition wall, the power drive unit is secured in the equipment fixing space so as to be in close contact with the partition wall, and the fin extending from the partition wall into the air introducing space are formed at the portion in the air introducing space which corresponds to the fixing position of the power drive unit. Therefore, heat of the power drive unit can be thermally conducted to the partition wall, and also the heat of the partition wall can be further conducted to the fin. The heat can be effectively removed by blowing air to the fin portion in the air introducing space. Accordingly, the power drive unit can be effectively cooled.

Furthermore, the motive power generation motor is disposed in the equipment fixing space, and the air holes through which the air introducing space intercommunicates with the equipment fixing space are formed at the motive power generating motor fixing portion of the partition wall, so that the air in the air introducing space can be fed to the motive power generation motor secured in the equipment fixing space. Therefore, by feeding air into the air introducing space, the air can be fed to the motive power generation motor, and thus the motive power generation motor can be effectively cooled by air.

Furthermore, the air introducing space and the equipment fixing space are formed so as to extend in the front-and-rear direction of the vehicle, the air introducing port to the air introducing space is formed in the neighborhood of the pivot shaft, the power drive unit is disposed between the pivot shaft and the motive power generation motor, and the fin are formed so as to extend from the air introducing port to the air holes of the motive power generation motor. Accordingly, the power drive unit and the motive power generation motor are arranged in the front-and-rear direction of the vehicle body along the shape of the swing arm extending in the front-and-rear direction of the vehicle body, whereby both the power drive unit and the motive power generation motor can be cooled by air.

Furthermore, the equipment fixing space is disposed at an outside portion in the width direction of the vehicle body than the air introducing space, and the detachable left-side cover is provided to cover the outer portion of the equipment fixing space with respect to the vehicle body, so that the power drive unit and the motive power generation motor disposed in the equipment fixing space at the outer portion of the vehicle body are exposed to the outside of the vehicle body by detaching the left-side cover, so that a maintenance work can be executed on the power drive unit and the motive power generation motor from the outside of the vehicle body.

The air introducing space is disposed at the inside portion in the width direction of the vehicle body as compared with the equipment fixing space, and the detachable inner cover covering the inner portion of the air introducing space with respect to the vehicle body is provided. Therefore, a maintenance work can be executed on the inside of the air introducing space by detaching the right-side cover to expose the air introducing space side. Furthermore, as compared with a case where the swing arm is manufactured as an integral structure, the main body can be easily molded by casting.

Furthermore, the plural fins are formed, the air holes are formed so as to correspond to the air introducing space which is partitioned into compartments by these fins. Therefore, air can be fed from each air hole into the motive power generation motor side every compartment and thus air feeding can be excellently performed.

Still furthermore, the swing arm is provided with the rib forming the air discharge passage through which the air introduced from the from the air holes intercommunicating from the air introducing space to the equipment fixing space is discharged through the motive power generation motor to the outside. Therefore, the air is guided to the air discharge port without disturbing the flow of the introduced air, whereby the motive power generation motor can be effectively cooled.

BRIEF DESCRIPTION OF THE DRAWINGS

FIG. 3 is viewed from the front side of a vehicle body;

EMBODIMENT FOR CARRYING OUT THE INVENTION

An electric motorcycle according to an embodiment of the present invention will be described hereunder with reference to the drawings. In the following description, the front-and-rear direction and the right-and-left direction correspond to directions based on a rider's view.

Figure 1:
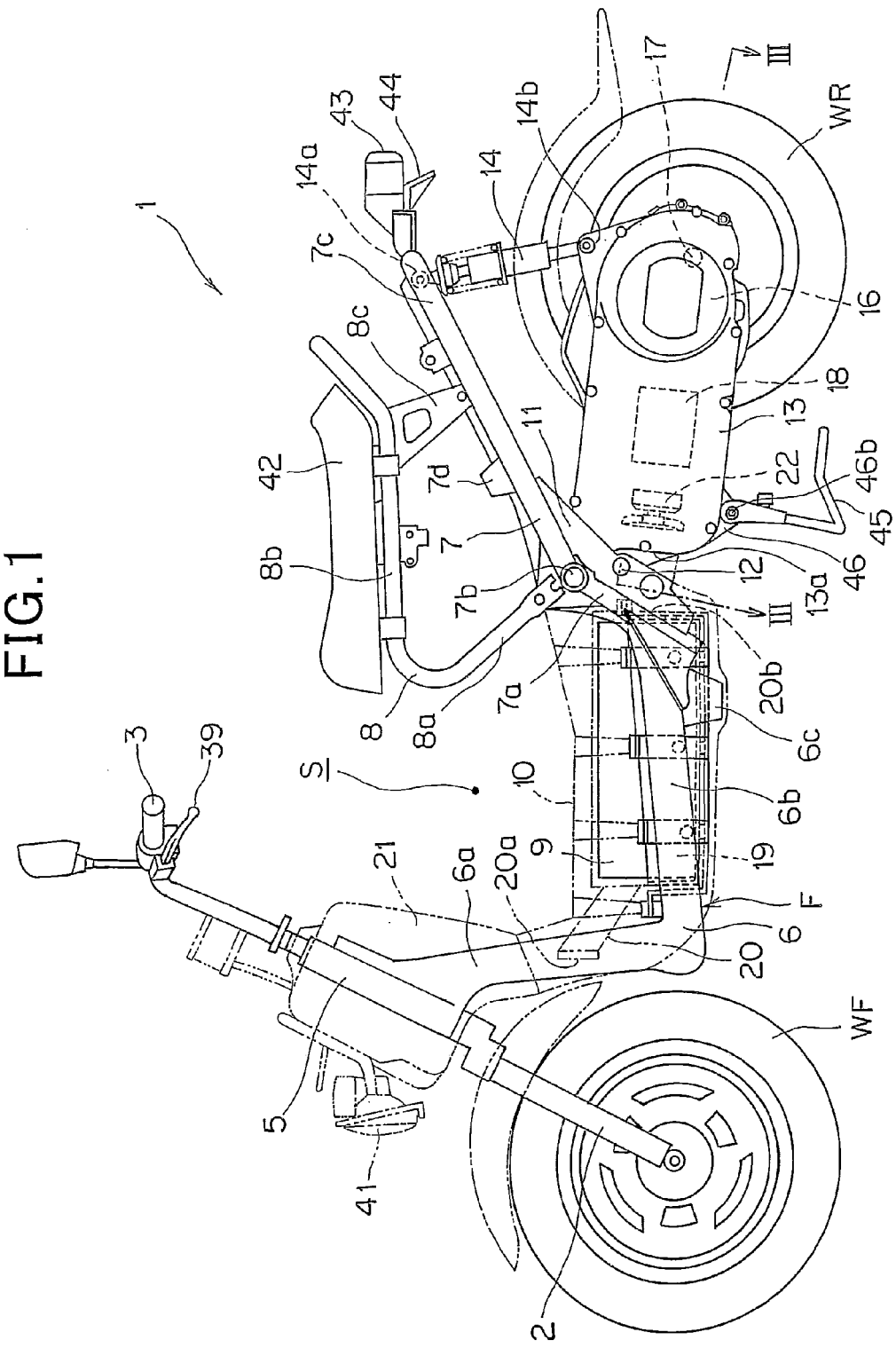
FIG. 1 is a side view of an electric motorcycle according to an embodiment of the present invention.
Figure 2:
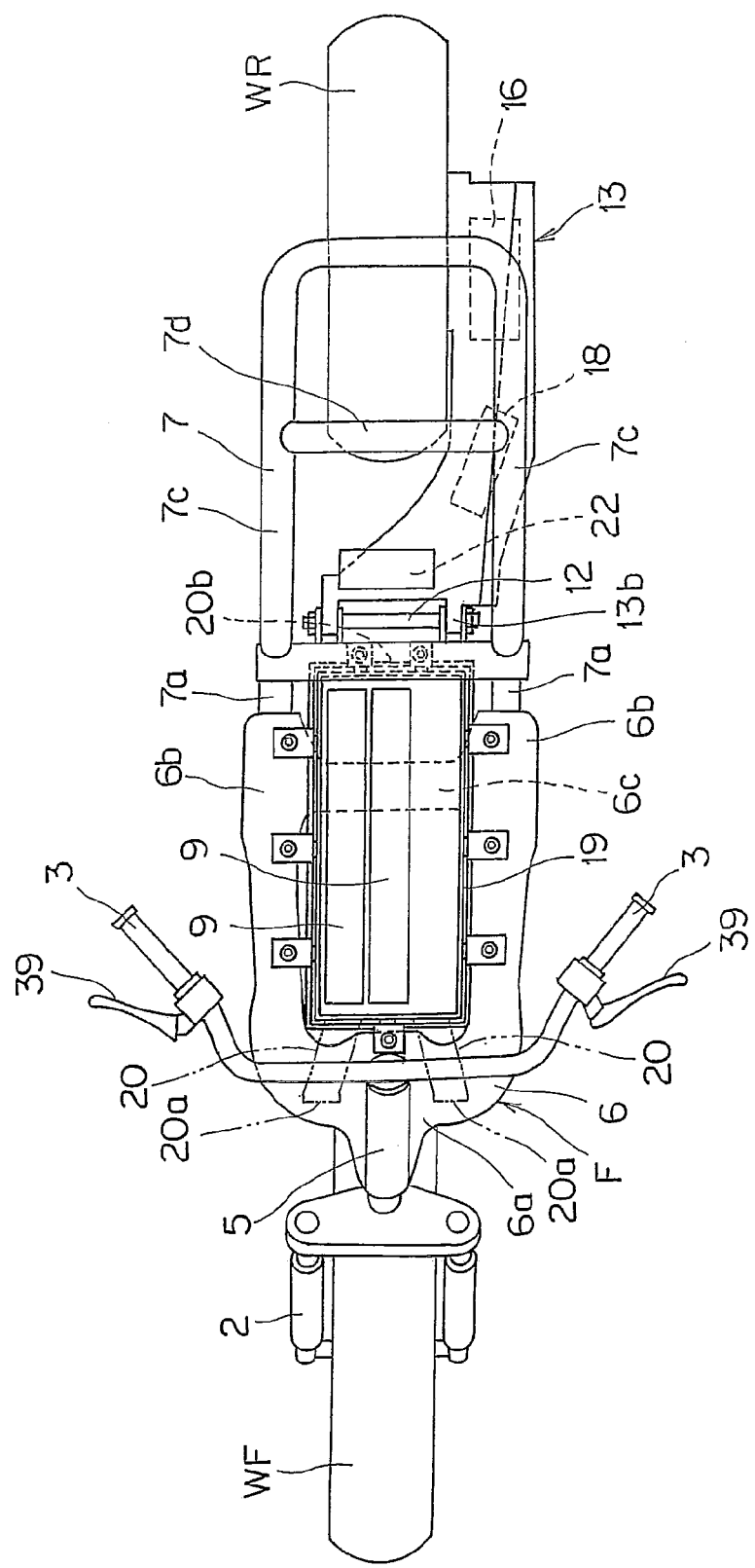
FIG. 2 is a plan view of FIG. 1.

FIG. 1 is a side view showing a battery driving type electric motorcycle (electric vehicle) according to an embodiment of the present invention, and FIG. 2 is a plan view of the electric motorcycle. In FIG. 2, a sheet rail 8, a fender cover 21 and a step floor 10 shown in FIG. 1 are omitted from the illustration to simplify the description.

As shown in FIG. 1, a vehicle body frame F of the electric motorcycle 1 has a front fork 2 for supporting a front wheel WF through a shaft and a head pipe 5 for supporting a steering handlebar 3 which is joined to the front fork 2 so that the steering handlebar 3 can be steered. The front fork 2 and the head pipe 5 are provided at the front end of the vehicle body frame F. The vehicle body frame F has center frames 6, rear frames 7 and a sheet rail 8. These frames and rails 6, 7 and 8 are provided so as to be respectively paired at the right and left symmetrical positions in the width direction of the vehicle body as shown in FIG. 2.

The center frame 6 comprises a slope portion 6a which is provided so as to be continuously connected to the head pipe 5 and extend obliquely to the rear lower side of the vehicle body, and a horizontal portion 6b which is bent at the lower end of the slope portion 6a and extends substantially horizontally to the rear side of the vehicle body. Furthermore, as shown in FIG. 2, the right and left horizontal portions of the center frames 6 are joined to each other in the vehicle width direction by a cross member 6c.

The rear frame 7 comprises a first slope portion 7a which extends from the rear end of the horizontal portion 6b of the center frame 6 obliquely to the rear upper side of the vehicle body, and a second slope portion 7c which extends from a bent portion 7b bent at the rear end of the first slope portion 7a obliquely to the rear upper side of the vehicle body so that the second slope portion 7b slants more gently than the first slope portion 7a. As shown in FIG. 2, the right and left second slope portions 7c are joined to each other by a cross frame 7d extending in the width direction of the vehicle body.

Furthermore, the sheet rail 8 is designed to be substantially inversely U-shaped and fixed at the upper side of the rear frame 7, and it has a slope portion 8a which extends from the bent portion 7b of the rear frame 7 obliquely to the front upper side of the vehicle body, a horizontal portion 8b which extends from the upper end of the slope portion 8a horizontally to the rear side, and a support portion 8c which extends from the rear portion of the horizontal portion 8b obliquely to the rear lower side toward the second slope portion 7c of the rear frame 7.

As shown in FIGS. 1 and 2, batteries 9 which will be described in detail later are accommodated in a battery box 19 at the horizontal portion 6b of the center frame 6. The battery box 19 is fixed so as to be pinched between the pair of right and left frames of the horizontal portions 6b, and the bottom surface of the battery box 19 is located to be positionally lower than the horizontal portions 6b in side view of FIG. 1. Furthermore, the cross member 6c of the center frame 6 is designed to be downwardly concaved at the center portion thereof in the width direction of the vehicle body, and the battery box 19 is fixedly mounted on the cross member 6c.

The portion at which the battery box 19 is mounted is a lower side portion of a so-called footrest space S, and the upper side of the battery box 19 is covered by a step floor 10 on which a rider puts his/her foots.

The battery box 19 is designed in a substantially rectangular parallelepiped box-like shape so that the batteries 9 are accommodated therein, and the batteries 9 are arranged at the right and left sides in the battery box 19. Air introducing ducts 20 for taking (introducing) outside air into the battery box 19 are provided at the right and left sides of the front surface of the battery box 19, and these air introducing ducts 20 have air introducing ports 20a at the front sides thereof. Furthermore, an air discharge port 20b for discharging introduced outside air to the outside of the battery box 19 is formed on the rear surface of the battery box 19.

Accordingly, the batteries 9 are cooled by the outside air taken from the air introducing ports 20a, and after the batteries 9 are cooled by outside air, the air can be discharged from the air discharge port 20b to the outside of the battery box 19.

As shown in FIG. 1, pivot plates 11 projecting to the rear side of the vehicle body are provided to the right and left rear frames 7 so as to be located in the neighborhood of the connecting portions to the center frames 6 and at the lower side of the bent portions 7b. A pivot shaft 12 is provided so as to penetrate through the right and left pivot plates 11 in the vehicle width direction. The front end portion of the swing arm 13 is fixed to the pivot shaft 12 so that the swing arm 13 turns (swings) vertically around the pivot shaft 12.

The swing arm 13 is linked to the second slope portion 7c of the rear frame 7 by a rear suspension 14 located at the left side in the width direction of the vehicle body. More specifically, the upper end portion 14a of the rear suspension 14 is fixed to the second slope portion 7c of the rear frame 7, and the lower end portion 14b of the rear suspension 14 is fixed to the rear portion of the swing arm 13. Accordingly, the vertical vibration of the rear wheel WR which is supported by the rear end portion of the swing arm 13 is adsorbed by the rear suspension 14.

A pair of turnable (swingable) support portions 13b which are turnably (swingably) secured to the pivot shaft 12 are provided to the front-side tip portion of the swing arm 13 so as to be spaced from each other at the right and left sides in the width direction of the vehicle body. This swing arm 13 extends from the pivot shaft 12 (the turnable support portions 13b) obliquely to the obliquely rear left side of the vehicle body so as to avoid the rear wheel WR, and then extends along the left side of the rear wheel WR to the rear portion of the vehicle body. A rear wheel shaft 17 extending in the vehicle width direction is provided to the rear portion of the swing arm 13, and the rear wheel WR is freely rotatably supported by the rear wheel shaft 17 in a one-side support style.

In FIGS. 1 and 2, reference numeral 41 represents a headlight for illuminating the front side of the vehicle body, reference numeral 42 represents a rider's seat fixed to the horizontal portions 8b of the sheet rails 8, reference numeral 43 represents a brake lamp fixed to the rear end portion of the rear frame 7 and reference numeral 44 represents a reflector located at the lower side of the brake lamp 43.

Figure 3:
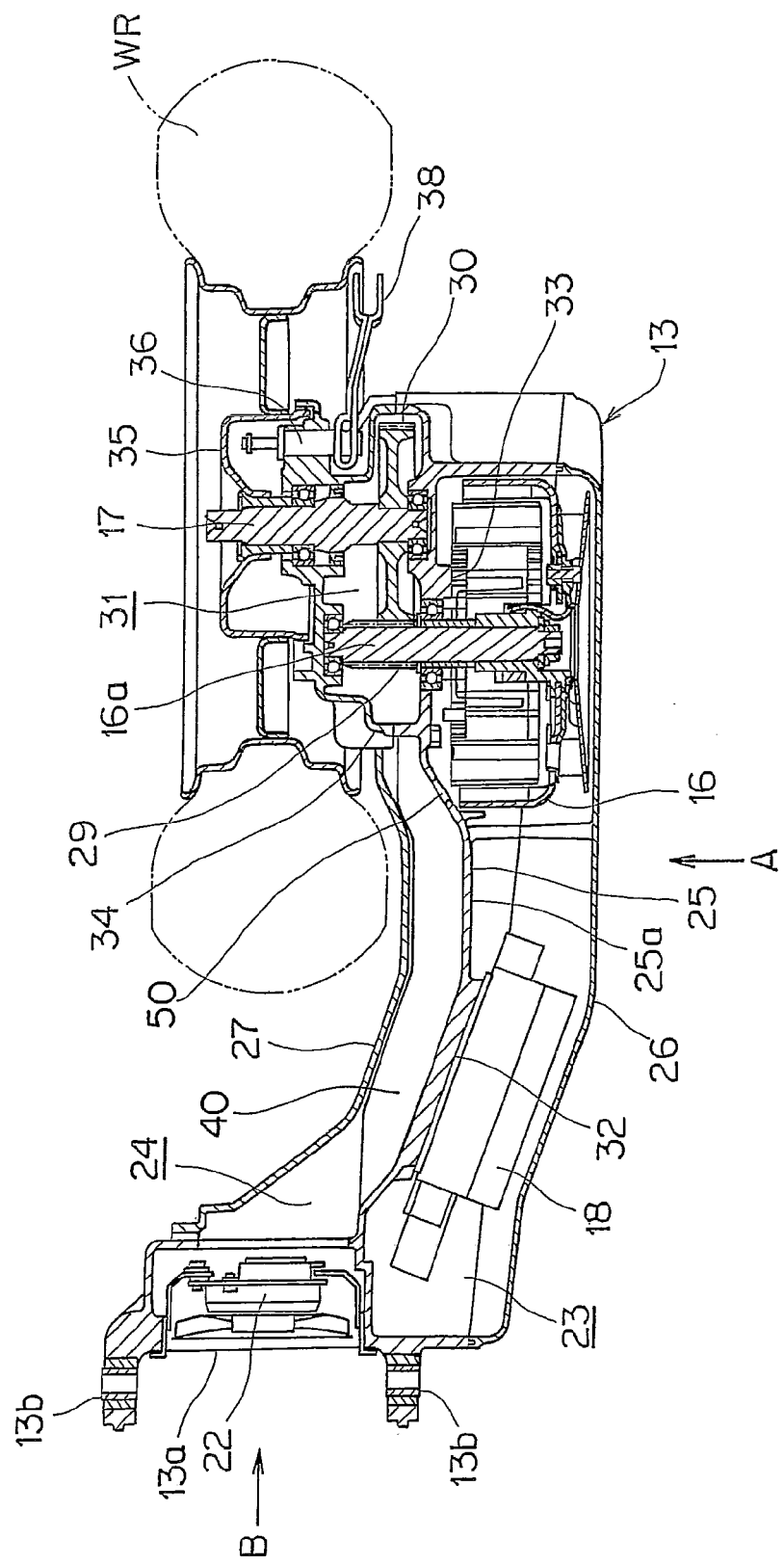
FIG. 3 is a cross-sectional view of FIG. 1, and also is a diagram showing a swing arm as a simple body.
Figure 4:
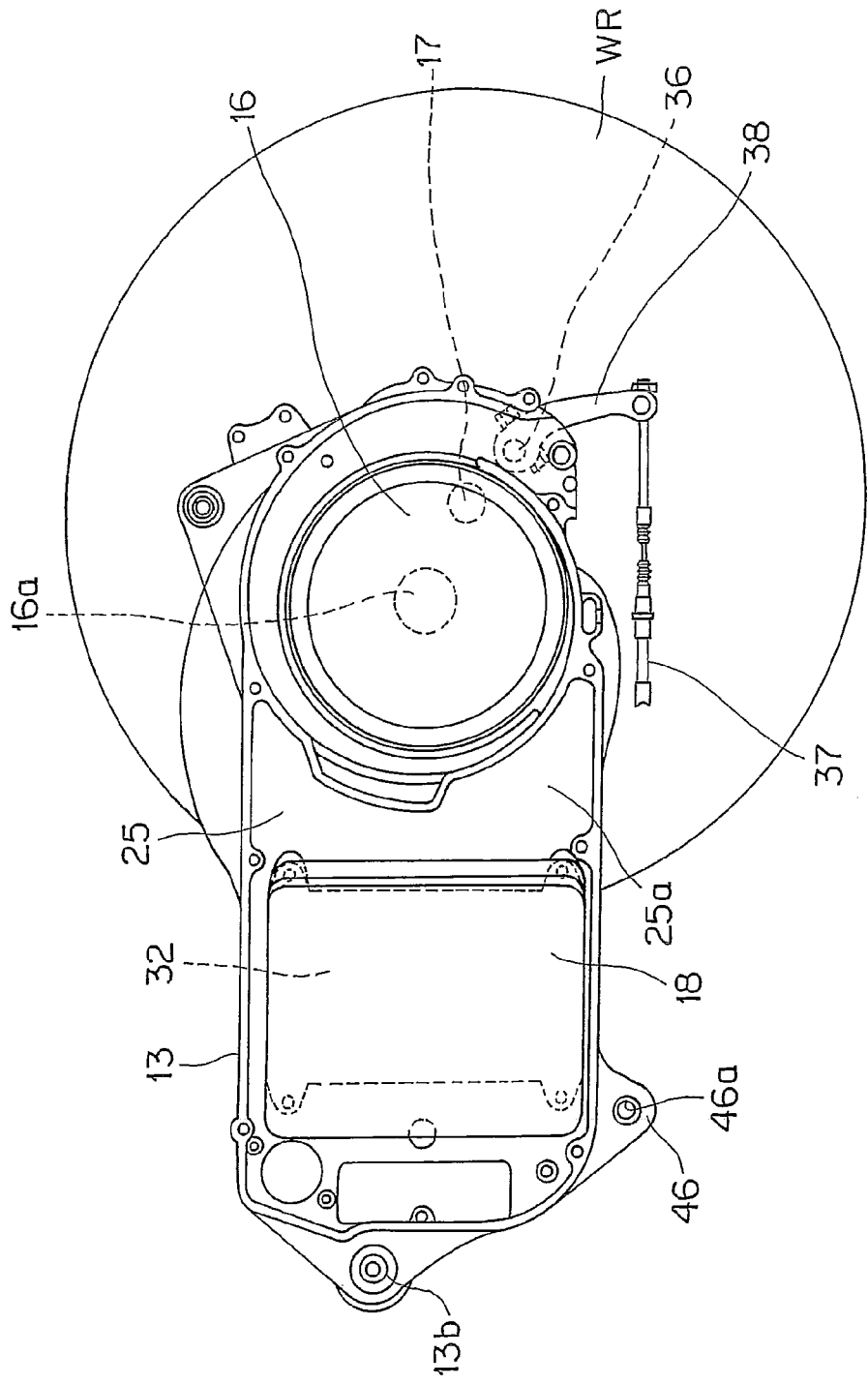
FIG. 4 is a right side view of FIG. 3.
Figure 5:
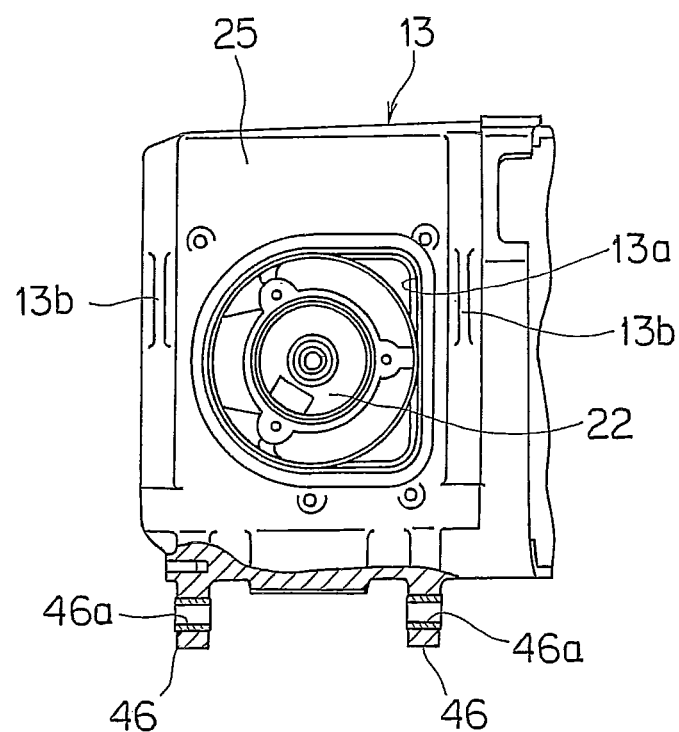
FIG. 5 is a view taken when

FIG. 3 is a cross-sectional view of FIG. 1, and also is a plan view showing the swing arm 13 as a single body. Furthermore, FIG. 4 is a left side view of FIG. 3 (viewed in a direction of A of FIG. 3), and also shows a state that a left-side cover (outer cover) 26 shown in FIG. 3 is detached. FIG. 5 is a view of FIG. 3 when viewed from the front side of the vehicle body (in a direction of B in FIG. 3).

As shown in FIG. 3, the swing arm 13 is constructed by assembling a main body portion 25 having a partition wall 25a extending in the front-and-rear direction of the vehicle body, a left-side cover 26 covering the left side space of the main body portion 25 and a right-side cover 27 covering the right side space of the main body portion 25.

Two spaces, that is, an equipment fixing space 23 located at the left side of the vehicle body (the outer portion of the vehicle body) and an air introducing space 24 located at the right side of the vehicle body (the inner portion of the vehicle body) are formed in the swing arm 13. These spaces 23 and 24 are compartmented at the right and left sides in the width direction of the vehicle body by the partition wall 25a described above, and designed so as to extend in the front-and-rear direction of the vehicle body.

Furthermore, the left side space of the equipment fixing space 23 is closed by detachably securing the let-side cover 26 with bolts or the like, and also the right side space of the air introducing space 24 is closed by detachably securing the right-side cover 27 with bolts or the like.

The motive power generation motor 16 for driving the rear wheel WR and PDU (Power Drive Unit) 18 for controlling the motive power generation motor 16 are mounted in the equipment fixing space 23. The motive power generation motor 16 and the PDU 18 can be subjected to maintenance by detaching the left-side cover 26.

As shown in FIG. 3, the motive power generation motor 16 is disposed at the rear portion of the swing arm 13, and detachably secured to a fixing portion 33 for the motive power generation motor 16 which is formed in the partition wall 25a. The driving shaft 16a of the motive power generation motor 16 is disposed substantially in parallel to the rear wheel shaft 17 of the rear wheel WR, and penetrates through the partition wall 25a so as to extend from the equipment fixing space 23 side to the air introducing space 24 side. A driving gear 29 is provided on the driving shaft 16a, and engaged with a decelerating gear 30 provided on the rear wheel shaft 17. This driving gear 29 is designed to be smaller in diameter than the decelerating gear 30, and the driving power of the motive power generation motor 16 is transmitted to the rear wheel shaft 17 in a single gear deceleration mode.

A gear cover 34 is secured to the main body portion 25 so as to cover the motive power transmitting units such as the driving gear 29, the deceleration gear 30, etc. This gear cover 34 partitions the air introducing space 24 and a driving power transmitting space 31 in which the motive power transmitting units are disposed, whereby the inside of the driving power transmitting space 31 is hermetically sealed and lubricant oil can be kept in the driving power transmitting space 31.

The gear cover 34 is provided with a pin member 36 for actuating a drum brake unit 35. This drum brake unit 35 is operated by manipulating a brake handle 39 fixed to the steering handlebar 3 at the left side. Specifically, a brake lever 38 is turned through a brake wire 37 shown in FIG. 4 by manipulating the brake handle 39, and the pin member 36 fixed to the brake lever 38 is operated, thereby actuating the brake of the rear wheel WR.

As shown in FIGS. 2 and 3, PDU 18 is disposed at the front side of the motive power generation motor 16, and it is detachably secured to a PDU fixing surface 32 formed on the partition wall 25*a* by bolts or the like. A driving circuit, a capacitor, a heat sink, etc. (not shown) are accommodated in PDU 18.

PDU 18 is connected to the battery 9 by a wire (not shown) so that power is fed from the battery 9 to PDU 18. PDU 18 is also connected through a wire to ECU (Electric Control Unit) (not shown) in which a control program, etc. are stored, and a control signal is transmitted from ECU to PDU 18. Furthermore, PDU 18 is also connected to the motive power generation motor 16 through a wire (not shown), and power and a control signal are transmitted from PDU 18 to the motive power generation motor 16. ECU described above is secured to the vehicle body side.

The driving circuit, etc. of PDU 18 generate a larger amount of heat as compared with the other parts, and thus PDU 18 is secured to the PDU fixing surface 32 of the partition wall 25*a* so as to come into close contact with the PDU fixing surface 32 so that the contact area therebetween is as large as possible, whereby heat occurring from the driving circuit, etc. are thermally conducted and radiated to the partition wall 25*a*.

Here, plural cooling fins 40 are formed on the partition wall 25*a* so as to project from the partition wall 25*a* into the air introducing space 24, and the heat which is thermally conducted from PDU 18 to the part it ion wall 25*a* is further thermally conducted from the partition wall 25*a* to the cooling fins 40.

A front-side opening portion 13*a* is formed at the front end potion of the air introducing space 24, and a cooling fan 22 for blowing air into the air introducing space 24 is fixed to the front-side opening portion 13*a*. This cooling fan 22 is disposed between the battery box 19 and PDU 18 in side view of FIG. 1, and it also has a function of sucking air in the battery box 19 from the air discharge port 20*b*. That is, the air discharge port 20*b* of the battery box 19 and the front-side opening portion 13*a* of the swing arm 13 are substantially positionally coincident with each other in the width and height directions of the vehicle body, and the openings of the air discharge port 20*b* and the front-side opening portion 13*a* are disposed so as to face each other, whereby the air discharged from the air discharge port 20*b* is efficiently taken into the front-side opening portion 13*a* by the cooling fan 22.

The shapes of the openings of the front-side opening portion 13*a* and the air discharge port 20*b* may be identical to each other or different from each other. For example, the front-side opening portion 13*a* may be changed in shape and arrangement so that not only air discharged from the battery box 19, but also traveling air flow can be positively taken from.

Air holes 50 communicating from the air introducing space 24 to the equipment fixing space 23 are formed at a portion of the partition wall 25*a* at which the motive power generation motor 16 is disposed. Accordingly, after air which is taken from the front-side opening portion 13*a* is passed through the air introducing space 24, the air flows from the air holes 50 into the motive power generation motor 16 to cool the inside of the motive power generation motor 16, and then discharged to the atmosphere.

The motive power generation motor 16, PDU 18 and the cooling fan 22 are vertically swung together with the rear wheel WR in conformity with the swing motion of the swing arm 13.

Furthermore, as shown in FIG. 5, a pair of fixing portions 46 for supporting a main stand 45 are formed at the lower portion of the swing arm 13 so as to be located at an interval at right and left sides in the width direction of the vehicle body. Accordingly, the main stand 45 is secured to the swing arm 13 by a fixing pin 46*b* (see FIG. 1) which is inserted in fixing holes 46*a* of the fixing portions 46, whereby the main stand 45 is swung together with the swing arm 13.

Figure 6:
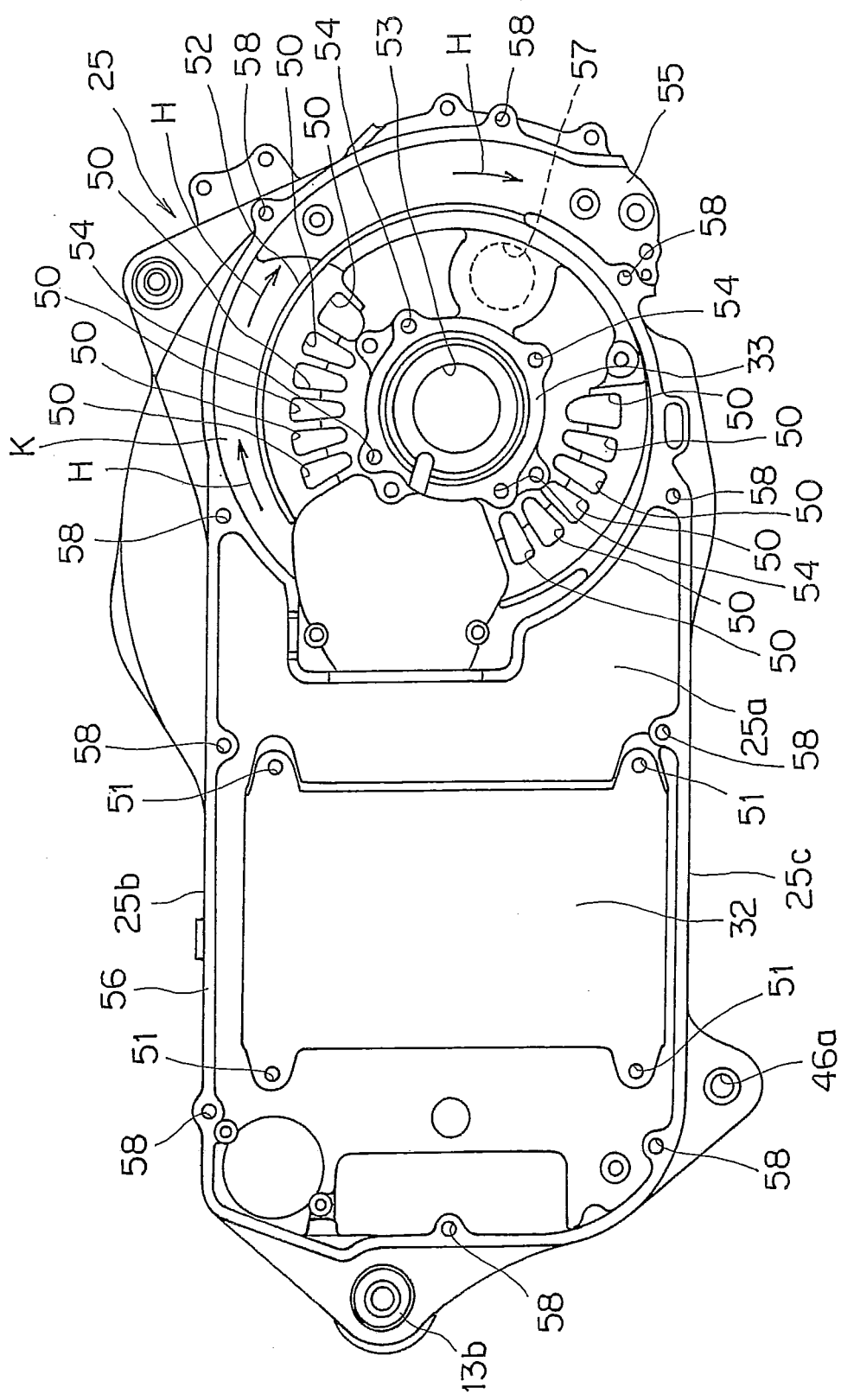
FIG. 6 is a side view taken when a main body portion is viewed from an equipment fixing space side.
Figure 7:
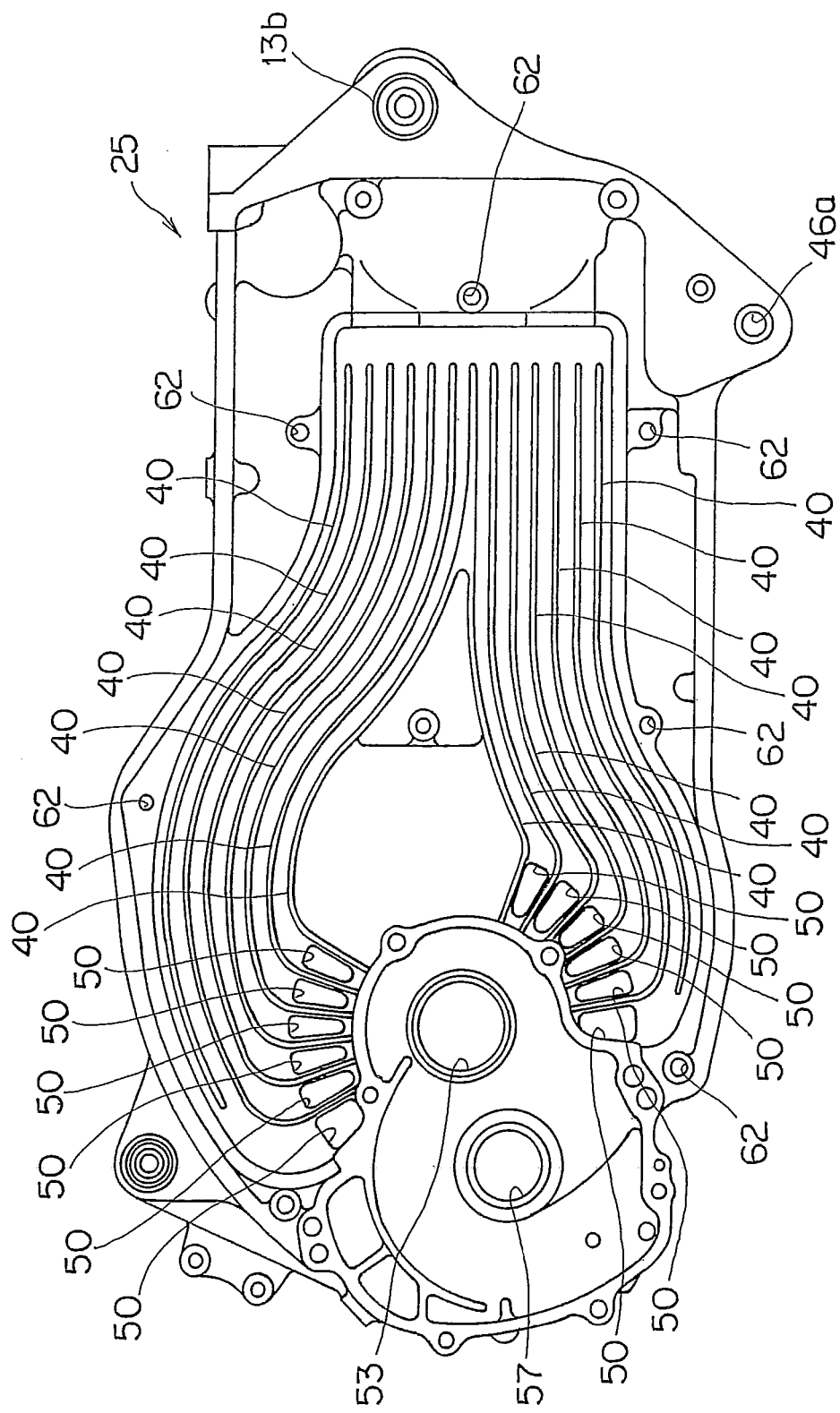
FIG. 7 is a side view taken when the main body portion is viewed from an air introducing space side.
Figure 8:
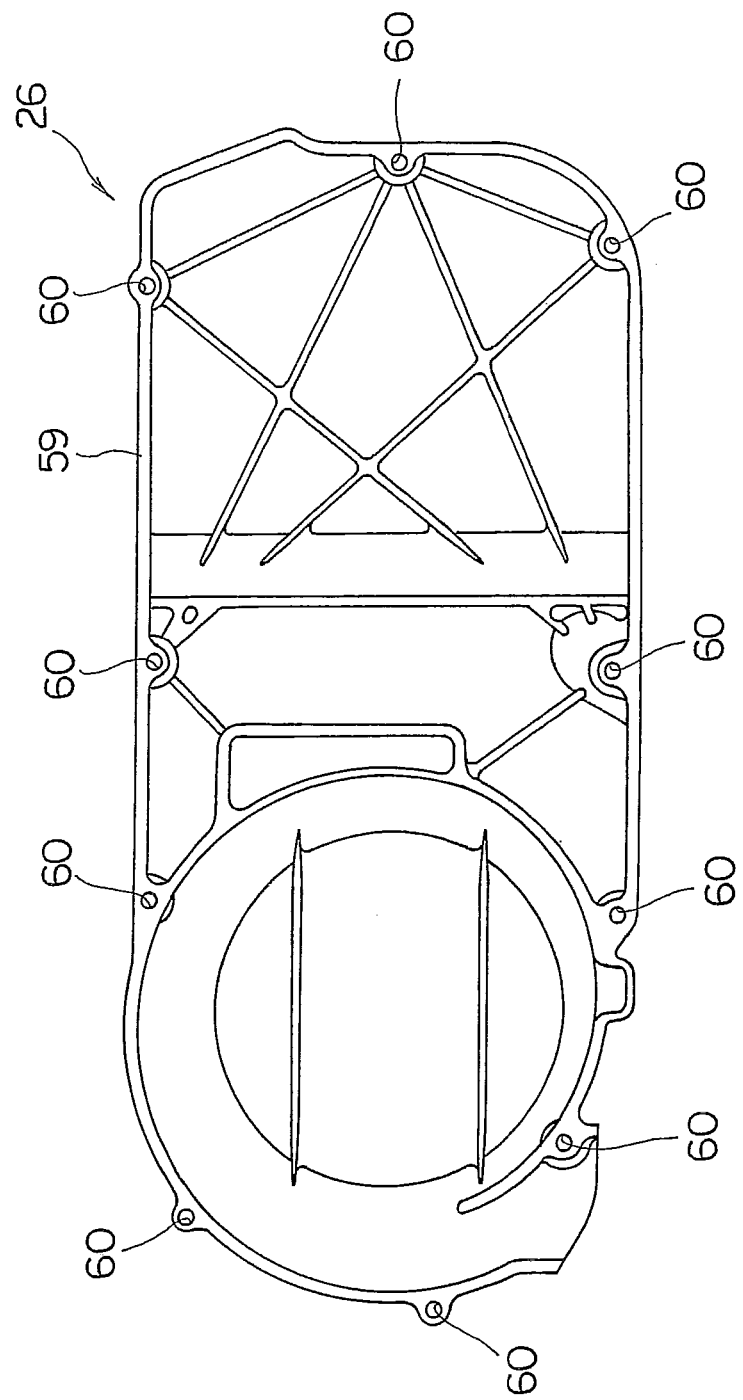
FIG. 8 is a front view of a left-side cover.
Figure 9:
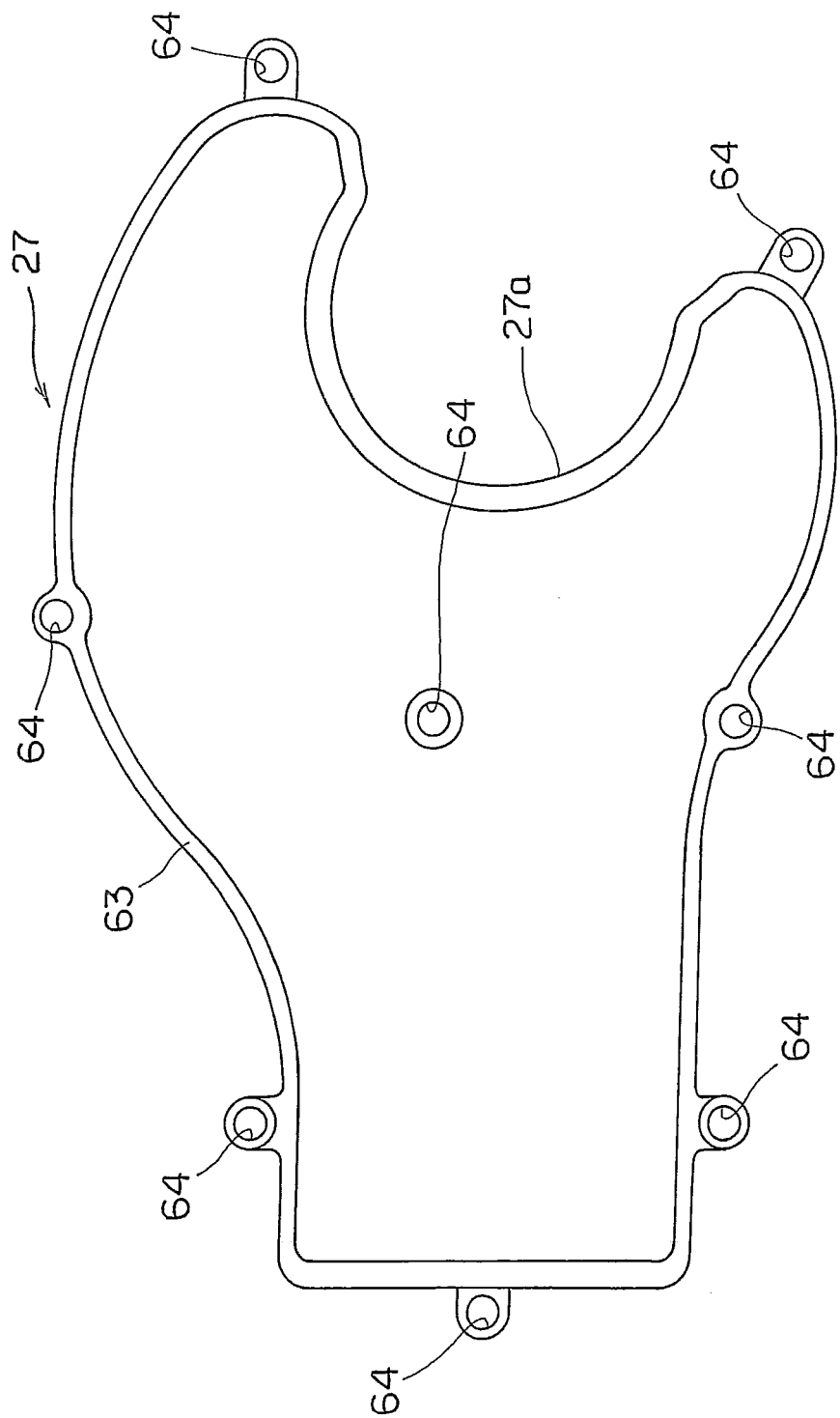
FIG. 9 is a front view of a right-side cover.

FIG. 6 is a side view of the main body portion 25 of the swing arm 13 when it is viewed from the left side (from the equipment fixing space 23 side), and FIG. 7 is a side view of the main body potion 25 when it is viewed from the right side (from the air introducing space 24 side). FIG. 8 is a front view of the left-side cover 26 when it is viewed from the main body portion 25 side, and FIG. 9 is a front view of the right-side cover 27 when it is viewed from the main body portion 25 side.

The main body 25 is molded by casting using aluminum material having excellent thermal conductivity. As shown in FIGS. 6 and 7, the partition wall 25*a*, an upper surface portion 25*b* and a lower surface portion 25*c* are formed integrally with one another so that the upper and lower portions of the partition wall 25*a* are sandwiched between the upper and lower surface portions 25*b* and 25*c*.

The partition wall 25*a* extends along the shape of the swing arm 13 in the front-and-rear direction of the vehicle body, and the PDU fixing surface 32 and the motive power generation motor fixing portion 33 are formed at the equipment fixing space 23 side of the partition wall 25*a* as shown in FIG. 6. The PDU fixing surface 32 is located at a portion of the swing arm 13 which extends from the center portion of the vehicle body obliquely to a side of the vehicle body (see FIGS. 2 and 3), and the PDU fixing surface 32 is also formed so as to extend from the center of the vehicle body obliquely to the side of the vehicle body in the direction from the front side of the vehicle body to the rear side of the vehicle body. The PDU fixing surface 32 and the fixing surface of PDU 18 are formed by substantially flat surfaces, the fixing surface of PDU 18 and the PDU fixing surface 32 are in close contact with each other, and the contact surface therebetween is large so that the thermal conductivity is enhanced. PDU fixing holes 51 for fixing PDU 18 by screws or the like are formed at the four corners of the PDU fixing surface 32.

At the motive power generation motor fixing portion 33 are formed the plural air holes 50 through which the air introducing space 24 and the equipment fixing space 23 intercommunicate with each other, an air guide wall 52 (rib) for guiding air taken from the plural air holes 50 in a circumferential direction of the motive power generation motor 16, and a penetration hole 53 through which the driving shaft 16*a* of the motive power generation motor 16 is inserted. Fixing holes 54 for fixing the motive power generation motor 16 are provided around the penetration hole 53.

The plural air holes 50 are located at the outside of the driving power transmitting space 31 (see FIG. 3) covered by the gear cover 34, and arranged in an circular arc shape around the penetration hole 53. The air introducing space 24 and the equipment fixing space 23 intercommunicate with each other through these air holes 50. Air flowing in the air introducing space 24 flows into the motive power generation motor 16 through the air holes 50.

As shown in FIG. 6, the air guide wall 52 is designed in a substantially circular arc shape, and forms an air discharge passage K through which air flowing to the motive power generation motor 16 side (indicated by an arrow H in FIG. 6) is clockwise guided from the obliquely left lower side to the obliquely right lower side along the peripheral direction of the motive power generation motor fixing portion 33. Accordingly, the air flowing from the air holes 50 cools a stator (not shown) of the motive power generation motor 16, passes through the air discharge passage K and then discharged from an air discharge port 55 (discharge port) located at the lower side of the main body portion 25.

The shape of the air guide wall 52 is set so that air is guided along the peripheral direction of the motive power generation motor 16, whereby rainwater or dust at the outside of the vehicle body is prevented from invading from the air discharge port 55 into the motive power generation motor fixing portion 33.

By attaching a waterproof fin having a labyrinth structure in the neighborhood of the air discharge port 55, it is made more difficult for rainwater or dust to invade from the air discharge port 55 into the motive power generation motor 33.

As shown in FIG. 7, the plural cooling fins 40 projecting from the partition wall 25a to the air introducing space 24 side (the opposite side to the equipment fixing space 23) are formed integrally with the partition wall 25a. The plural cooling fins 40 extend from the front-side opening portion 13 to the plural air holes 50 so that they pass near the back side of the motive power generation motor fixing portion 33 and are curved as if an arc is drawn along the circumference corresponding to the outer shape of the motive power generation motor 16. The shape of the fins described above functions so that air taken from the front-side opening portion 13a is passed between the adjacent cooling fins 40 and guided to the corresponding air hole 50. The cooling fins 40 also function as reinforcing members which enhance the mechanical strength (rigidity) of the main body portion 25, and contributes to reduction in weight of the overall swing arm 13. Furthermore, the cooling fins 40 extend from the back side portion of the PDU fixing surface 32 to the back side portion of the motive power generation motor fixing portion 33, and thus they effectively adsorb heat from the partition wall 25a corresponding to these portions and radiate the heat. Furthermore, the plural cooling fins 40 are provided so as to come into contact with air at a larger area, thereby effectively radiating heat from the partition wall 25a.

Furthermore, as shown in FIG. 7, the partition wall 25a is provided with a receiving portion 57 for supporting a bearing fixed to the left end potion of the rear wheel shaft 17.

As shown in FIG. 6, when viewed from the equipment fixing space 23 side, plural fixing holes 58 for fixing the left-side cover 26 are formed at the edge portions 56 of the upper and lower surface portions 25b and 25c. In connection with these fixing holes 58, fixing holes 60 penetrating through the outer side surface of the left-side cover 26 are formed at the peripheral edge portion 59 of the inner surface of the left-side cover 26 so as to be located at the positions corresponding to the fixing holes 58. The left-side cover 26 is detachably secured to the main body portion 25 by inserting bolts or the like into the fixing holes 60 and screwed into the fixing holes 58.

The left-side cover 26 may be integrally molded by aluminum cast metal having excellent thermal conductivity, or integrally molded by a molded article.

Likewise, when viewed from the air introducing space 24 side, plural fixing holes 62 for fixing the right-side cover 27 are formed at the edge portions 61 of the upper and lower surface portions 25b and 25c and at the center portion of the main body portion 25 as shown in FIG. 7. In connection with these fixing holes 62, as shown in FIG. 9, fixing holes 64 penetrating through the outer surface of the right-side cover 27 are formed at the peripheral edge portion 63 and the center portion of the inner surface of the right-side cover 27 so as to be located at the positions corresponding to the fixing holes 62. The right-side cover 27 is detachably secured to the main body portion 25 by inserting bolts or the like into the fixing holes 64 and screwed into the fixing holes 62.

As shown in FIG. 9, the rear end portion 27a of the right-side cover 27 is designed to be recessed in a substantially circular arc shape so as to avoid the rear wheel shaft 17.

The right-side cover 27 may be integrally molded by aluminum cast metal having excellent thermal conductivity or integrally molded by a molded article.

As shown in FIGS. 6 and 7, a fixing hole 46a for fixing the main stand 45 is formed at the lower surface portion 25c of the front-side lower portion of the main body portion 25.

According to this embodiment of the present invention, in the electric motorcycle 1 in which PDU 18 and the motive power generation motor 16 for traveling are secured to the swing arm 13 swinging around the center of the pivot shaft 12 and power from the battery 9 is supplied through PDU 18 to the motive power generation motor 16, the hollow inside of the swing arm 13 is compartmented into the air introducing space 24 and the equipment fixing space 23 by the partition wall 25a, PDU 18 is mounted in the equipment fixing space 23 so as to be in close contact with the partition wall 25a, and the cooling fins 40 extending from the partition wall 25a into the air introducing space 24 are formed at the portion in the air introducing space 24 which corresponds to the fixing position of PDU 18. Therefore, heat of PDU 18 can be thermally conducted to the partition wall 25a, and also the heat of the partition wall 25a can be further conducted to the cooling fins 40. Accordingly, the heat can be effectively removed by feeding air to the cooling fins 40 in the air introducing space 24.

Furthermore, the motive power generation motor 16 is disposed in the equipment fixing space 23, and the air holes 50 through which the air introducing space 24 intercommunicates with the equipment fixing space 23 are formed at the motive power generating motor fixing portion 33 of the partition wall 25a, so that the air in the air introducing space 24 can be fed to the motive power generation motor 16 mounted in the equipment fixing space 23. Therefore, by feeding air into the air introducing space 24, the air can be efficiently fed to the motive power generation motor 16, and thus the motive power generation motor 16 can be effectively cooled by air.

Furthermore, the air introducing space 24 and the equipment fixing space 23 are formed so as to extend in the front-and-rear direction of the vehicle, the front-side opening portion 13a of the air introducing space 24 is formed in the neighborhood of the pivot shaft 12, PDU 18 is disposed between the pivot shaft 12 and the motive power generation motor 16, and the plural cooling fins 40 are formed so as to extend from the front-side opening portion 13a to the air holes 50 of the motive power generation motor 16. Accordingly, PDU 18 and the motive power generation motor 16 are arranged in the front-and-rear direction of the vehicle body along the shape of the swing arm 13 extending in the front-and-rear direction of the vehicle body, whereby both PDU and the motive power generation motor 16 can be cooled by air.

Furthermore, the equipment fixing space 23 is disposed at an outside portion in the width direction of the vehicle body than the air introducing space 24, and the detachable left-side cover 26 is provided to cover the outer portion of the equipment fixing space 23 with respect to the vehicle body, so that PDU 18 and the motive power generation motor 16 disposed in the outer equipment fixing space 23 are exposed to the outside of the vehicle body by detaching the left-side cover 26, so that a maintenance work can be executed on PDU 18 and the motive power generation motor 16 from the outside of the vehicle body.

The air introducing space 24 is disposed at the inside portion in the width direction of the vehicle body as compared with the equipment fixing space 23, and the detachable right-side cover 27 (inner cover) covering the inner portion of the air introducing space 24 with respect to the vehicle body is provided. Therefore, a maintenance work can be executed on the inside of the air introducing space 24 by detaching the right-side cover 27 to expose the air introducing space 24 side. Furthermore, as compared with a case where the swing arm 13 is manufactured as an integral structure, the main body 25 can be easily molded by casting.

Furthermore, the plural cooling fins 40 are formed, the air holes 50 are formed so as to correspond to the compartments into which the air introducing space 24 is sectioned by these cooling fins 40. Therefore, air can be fed from each air hole 50 into the motive power generation motor 16 side every compartment and thus air feeding can be excellently performed.

Still furthermore, the swing arm 13 is provided with the air guide wall 52 (rib) forming the air discharge passage K through which the air introduced from the from the air holes 50 intercommunicating from the air introducing space 24 to the equipment fixing space 23 is discharged through the motive power generation motor 16 to the outside. Therefore, the air is guided to the air discharge port 55 without disturbing the flow of the introduced air, whereby the motive power generation motor 16 can be effectively cooled.

DESCRIPTION OF REFERENCE NUMERALS 1 electric motorcycle
2 front fork
3 steering handlebar
5 head pipe
6 center frame
7 rear frame
8 sheet rail
9 battery
10 step floor
11 pivot plate
12 pivot shaft
13 swing arm
13*a* front-side opening portion
13*b* turnable (swingable) support portion
14 rear suspension
14*a* upper end portion
14*b* lower end portion
16 motive power generation motor
16*a* driving shaft
17 rear wheel shaft
18 PDU (Power Drive Unit)
19 battery box
20 air introducing duct
20*a* air introducing port
20*b* air discharge port
21 fender cover
22 cooling fan
23 equipment fixing space
24 air introducing space
25 main body portion
25*a* partition wall
25*b* upper surface portion
25*c* lower surface portion
26 left-side cover (outer cover)
27 right-side cover (inner cover)
27*a* rear end portion
29 driving gear
30 decelerating gear
31 driving power transmitting space
32 PDU fixing surface
33 motive power generation motor fixing portion
34 gear cover
35 drum brake unit
36 pin member
37 brake wire
38 brake lever
39 brake handle
40 cooling fin
45 main stand
46 fixing portion
47 bracket
50 air hole
51 PDU fixing hole
52 air guide wall (rib)
53 penetration hole
54 fixing hole
55 air discharge port (discharge port)
F vehicle body frame
S footrest space
WF front wheel
WR rear wheel

The invention claimed is:

1. An electric motorcycle having a power drive unit and a motive power generation motor secured to a swing arm configured to swing about a pivot shaft, and power from a battery being supplied through the power drive unit to the motive power generation motor, the electric motorcycle comprising:
 a hollow inside of the swing arm partitioned into an air introducing space and an equipment fixing space by a partition wall,
 wherein the power drive unit is located in the equipment fixing space and is secured to a fixing surface of the partition wall, and
 at least one fin extending from the partition wall into the air introducing space.

2. The electric motorcycle according to claim 1, wherein the motive power generation motor is disposed in the equipment fixing space, and air holes through which the air introducing space and the equipment fixing space intercommunicate with each other are formed at a fixing portion of the partition wall at which the motive power generation motor is fixed.

3. The electric motorcycle according to claim 2, wherein the air introducing space and the equipment fixing space are formed so as to extend in a front-and-rear direction of the motorcycle,
 an air introducing port leading to the air introducing space is formed near the pivot shaft,
 the power drive unit is disposed between the pivot shaft and the motive power generation motor, and
 the at least one fin is formed so as to extend from the air introducing port to the air holes.

4. The electric motorcycle according to claim 3, wherein the equipment fixing space is disposed at a first lateral side of the swing arm of the motorcycle,
 the air introducing space is disposed at a second lateral side of the swing arm of the motorcycle, and
 a detachable outer cover is provided to cover an outer portion of the equipment fixing space on the first lateral side of the swing arm.

5. The electric motorcycle according to claim 2, wherein a plurality of fins are formed, and the air holes are formed so as to correspond to the air introducing space compartmented by the fins.

6. The electric motorcycle according to claim 2, wherein the equipment fixing space is disposed at a first lateral side of the swing arm of the motorcycle,
the air introducing space is disposed at a second lateral side of the swing arm of the motorcycle, and
a detachable outer cover is provided to cover an outer portion of the equipment fixing space on the first lateral side of the swing arm.

7. The electric motorcycle according to claim 2, wherein, relative to an outside portion of the swing arm where the equipment fixing space is disposed, the air introducing space is disposed at an inside portion at a lateral side of the swing arm of the motorcycle, and
a detachable inner cover is provided to cover the inner portion of the air introducing space.

8. The electric motorcycle according to claim 3, wherein, relative to an outside portion of the swing arm where the equipment fixing space is disposed, the air introducing space is disposed at an inside portion at a lateral side of the swing arm of the motorcycle, and
a detachable inner cover is provided to cover the air introducing space.

9. The electric motorcycle according to claim 1, wherein the equipment fixing space is disposed at a first lateral side of the swing arm of the motorcycle,
the air introducing space is disposed at a second lateral side of the swing arm of the motorcycle, and
a detachable outer cover is provided to cover an outer portion of the equipment fixing space on the first lateral side of the swing arm.

10. The electric motorcycle according to claim 1, wherein, relative to an outside portion of the swing arm where the equipment fixing space is disposed, the air introducing space is disposed at an inside portion at a lateral side of the swing arm of the motorcycle, and
a detachable inner cover is provided to cover the air introducing space.

11. The electric motorcycle according to claim 1, wherein the swing arm is provided with a rib forming an air discharge passage through which air introduced from air holes communicating from the air introducing space to the equipment fixing space is discharged outside of the equipment fixing space through the motive power generation motor.

* * * * *